United States Patent [19]

Kazaoka et al.

[11] Patent Number: 4,666,209
[45] Date of Patent: May 19, 1987

[54] SEAT ASSEMBLY FOR VEHICLES

[75] Inventors: Kenichi Kazaoka, Nagoya; Hiroshi Okazaki, Toyota; Motoi Hyodo, Toyota, all of Japan

[73] Assignee: Aisin Seiki Kabushiki Kaisha, Kariya, Japan

[21] Appl. No.: 725,170

[22] Filed: Apr. 23, 1985

Related U.S. Application Data

[63] Continuation of Ser. No. 402,559, Jul. 28, 1982, abandoned.

[30] Foreign Application Priority Data

Jul. 28, 1981 [JP] Japan .................................. 56-118117
Aug. 28, 1981 [JP] Japan .......................... 56-127613[U]
Aug. 29, 1981 [JP] Japan .......................... 56-128513[U]

[51] Int. Cl.⁴ .......................... A47C 7/42; B60N 1/02; F16M 13/00
[52] U.S. Cl. .................................. 297/344; 248/429; 297/218; 297/451
[58] Field of Search ............... 297/344, 346, 216, 218, 297/443, 451, 450, 449; 248/429, 430; 312/336, 338, 349

[56] References Cited

U.S. PATENT DOCUMENTS

| | | | |
|---|---|---|---|
| 221,307 | 11/1879 | Hirsch | 312/338 |
| 743,210 | 11/1903 | Witte | 297/451 |
| 2,307,305 | 1/1943 | Saunders et al. | 297/344 |
| 2,719,579 | 10/1955 | Schaffer | 297/443 |
| 3,928,898 | 12/1975 | Sonoot | 297/218 |
| 3,930,632 | 1/1976 | Shigeta et al. | 297/346 |
| 3,938,771 | 2/1976 | Urai | 297/346 |

FOREIGN PATENT DOCUMENTS

| | | | |
|---|---|---|---|
| 2841511 | 4/1980 | Fed. Rep. of Germany | 248/430 |
| 0008957 | 1/1980 | Japan | 248/430 |
| 0099828 | 8/1981 | Japan | 297/344 |

Primary Examiner—Kenneth J. Dorner
Assistant Examiner—Mark W. Binder
Attorney, Agent, or Firm—Oblon, Fisher, Spivak, McClelland & Maier

[57] ABSTRACT

A seat assembly for vehicles is provided which prevents the damage to a seat sliding mechanism upon a collision of the vehicle occurring and includes a seat frame which improves the strength of the combination between the seat frame and a bracket connected with a back rest frame. The construction of the seat for a vehicle is such that an upper rail is positioned or enclosed in a lower rail, the seat frame has a rectangular shaped channel found therein and the bracket connected with the back rest has a projection portion engaging with the rectangular shaped channel concave portion.

5 Claims, 12 Drawing Figures

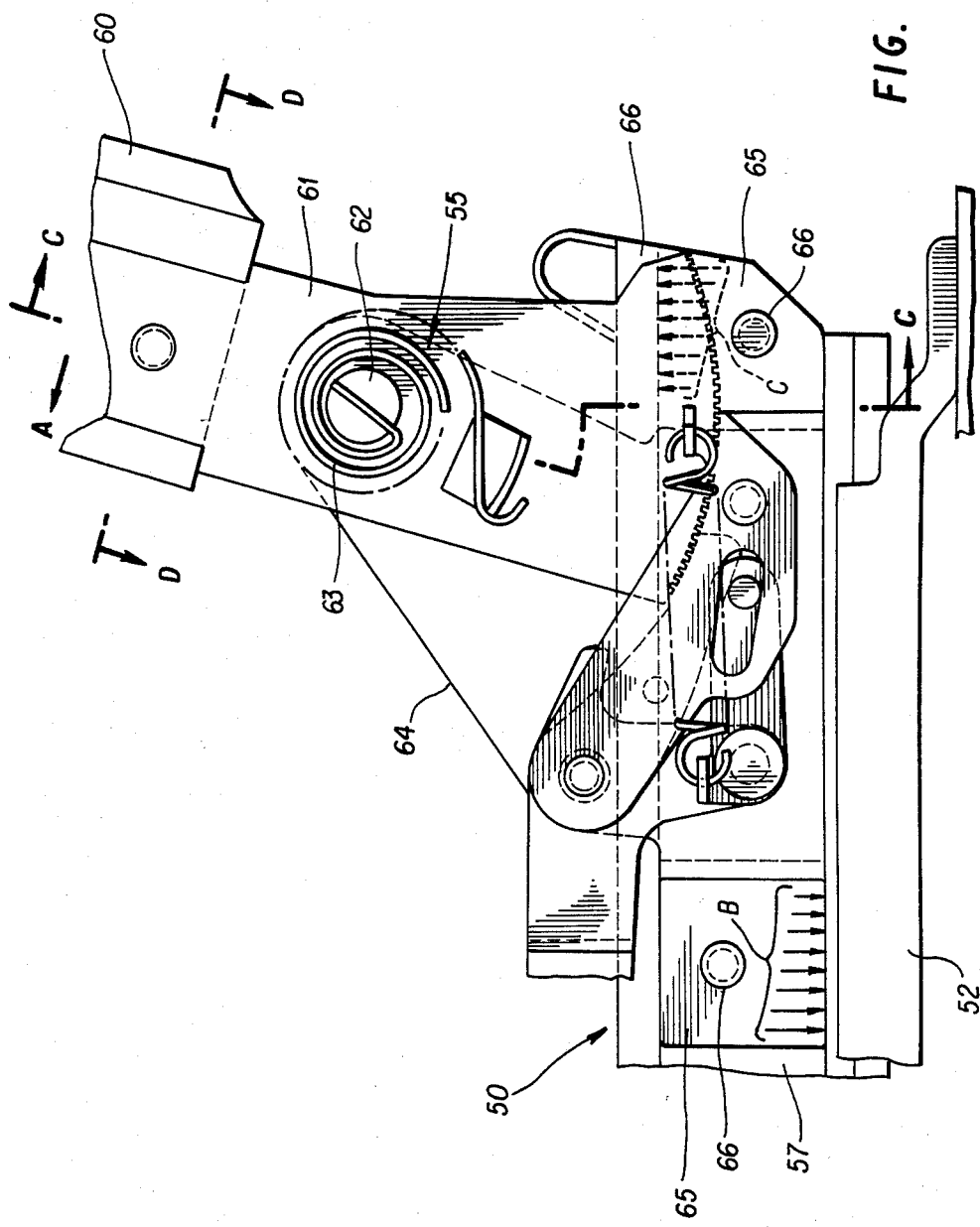

SEAT ASSEMBLY FOR VEHICLES

This application is a continuation of application Ser. No. 402,559, filed July 28, 1982, now abandoned.

BACKGROUND OF THE INVENTION

1. Field of the Invention

This invention relates to seats in use for vehicles and, more particularly, to a seat frame used for vehicles.

2. Description of the Prior Art

An example of a conventional seat of this type is disclosed in FIGS. 1, 2, 3 and 4. Recliner lower arms 11, 11 are fixedly secured on the both sides of a seat frame 10 being in form of a box. Recliner upper arms 12, 12 are functionally connected with the recliner lower arms 11, 11. Functionally interposed between one recliner lower arm 11 and one recliner upper arm 12 is a seat recliner mechanism 13 which adjusts a back rest of a seat (not shown).

A seat sliding mechanism 14 comprises locking plates 16, 16 fixedly secured on brackets 15 fixed on a floor of a motor vehicle, a plurality of latch teeth 17 formed in the locking plates 16, lower rails 18 fixed on the locking plates 16, upper rails 20 movable in the forward and rearward direction by means of rollers 19 against the lower rails 18, a pawl 21 positioned inside of the recliner lower arms 11 and capable of engaging with one of the teeth 17, and an operational handle 22 functionally connected with the pawl 21 for releasing the engagement between one of the latch teeth 17 and the pawl 21.

In this conventional seat of a vehicle as shown in FIG. 3 and FIG. 4, when a load is placed on the seat back of the seat due to a collision of vehicles as shown by an arrow in FIG. 3, the load will be placed on the upper rail 20 in the upper direction as shown by an upper directional arrow in FIG. 4 and on the lower rail 18 in the lower direction as shown by an lower directional arrow in FIG. 4. Since there are no means which place restrictions on the spread of flange portions 20a and 20b of the upper rail 20 and the spread of flange portions 18a and 18b of the lower rail 18, the flange portions 20a, 20b, 18a, 18b will spread and enlarge and the seat sliding mechanism 14 will thus be destroyed.

Furthermore, the construction of a conventional seat frame shows that a bracket is interposed between a seat frame and a back rest frame for combining both frames and that the combination of the bracket and the seat frame is formed by bringing the same into surface contact with each other and by using a pin or a bolt to connect them together. Therefore, a large load is centered at the pin or the bolt on collision of the vehicles. As a result, the pin or the bolt is damaged, or the seat frame and the bracket is damaged. In order to prevent this damage it is necessary to enlarge the thickness of the conventional bracket and the seat frame and the diameter of the pin or bolt. This means, however, increasing the weight of the seat which thus makes it heavy and difficult to handle. That is to say, this contradicts the possibility of saving energy where the weight of the vehicle is to be lightened.

SUMMARY OF THE INVENTION

It is, accordingly, an object of this invention to eliminate the above-mentioned disadvantages of the conventional seat of motorcars.

It is another object of this invention to provide a seat which prevents damage occurring to the seat sliding mechanism.

It is a further object of this invention to provide a seat which includes the construction of a seat frame which improves the strength of the combination between the seat frame and the bracket connected with the back rest frame.

It is an additional object of this invention to provide a seat which decreases the number of parts forming the seat and which lightens the weight of the seat.

According to the present invention, upper rails of the seat sliding mechanism are formed on the lower end of both sides of the seat frame. The upper rail is engaged with a lower rail so that the upper rail may be positioned or enclosed in a lower rail. This is to say, the seat frame includes the functions of the recliner lower arm and the upper rail and, at the same time, the locking plate includes the functions of the lower rail. Furthermore, a concave portion is formed on the outside wall of the seat frame and a projection is then formed on the bracket connected with the back rest frame. The load placed on the back rest frame can be dispersed by engaging the concave portion with the projection, and then the dispersed load is transmitted to the seat frame.

Various other objects, features and attendant advantages of the present invention will be more fully appreciated as the same becomes better understood from the following detailed description when considered in connection with the accompanying drawings in which like reference characters designate like or coresponding parts throughout the several views and wherein:

BRIEF DESCRIPTION OF THE DRAWINGS

FIG. 9 is a side view showing a combination between a seat frame and back rest frame, according to the present invention.

DETAILED DESCRIPTION OF THE PREFERRED EMBODIMENTS

Figure 1:
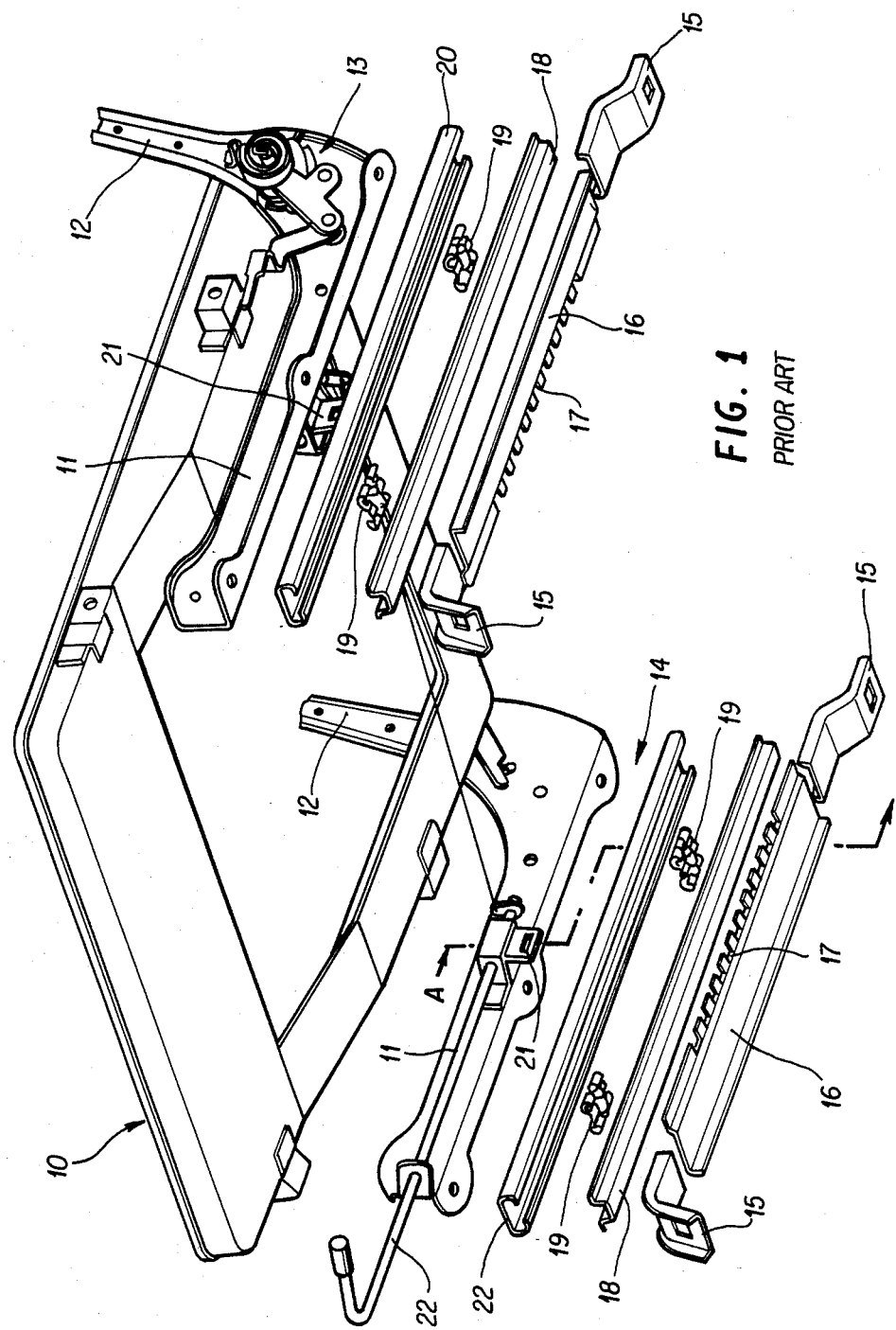
FIG. 1 is an exploded perspective view of a conventional seat for vehicles.
Figure 2:
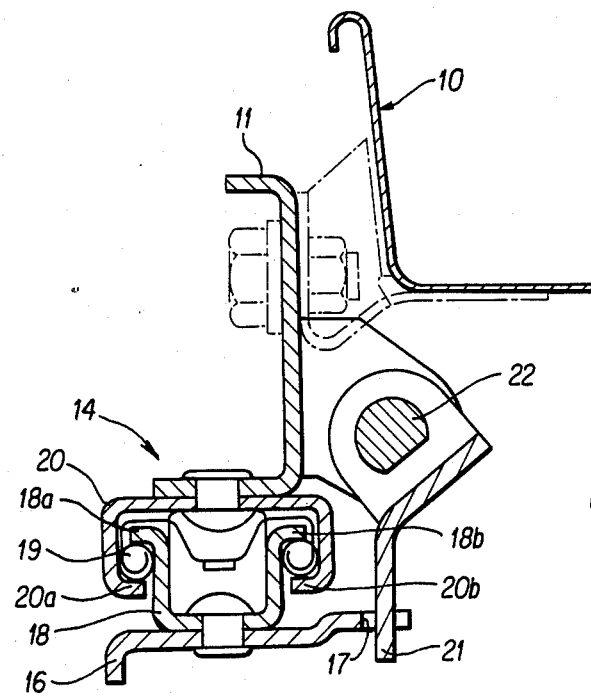
FIG. 2 is a sectional view taken along line A—A in FIG. 1.
Figure 4:
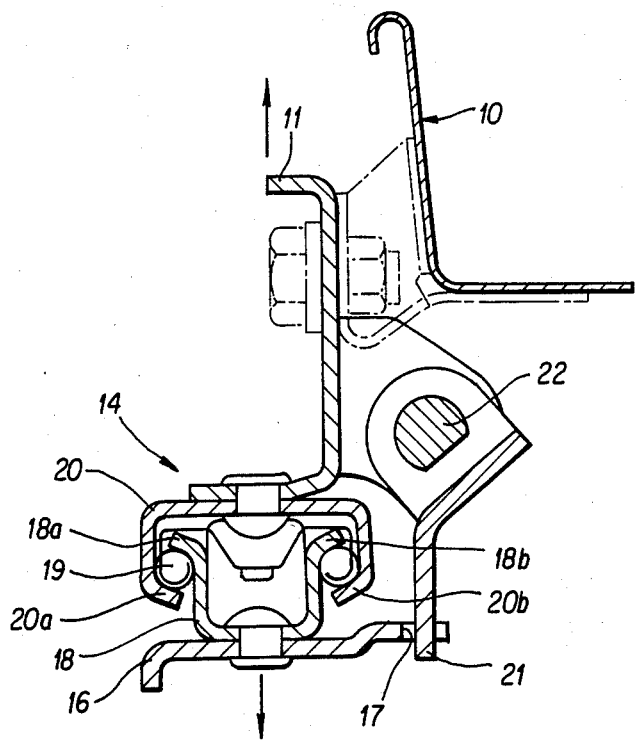
FIG. 4 is a sectional view of the seat recliner mechanism when a load acts in the upper and lower direction in FIG. 2.
Figure 3:
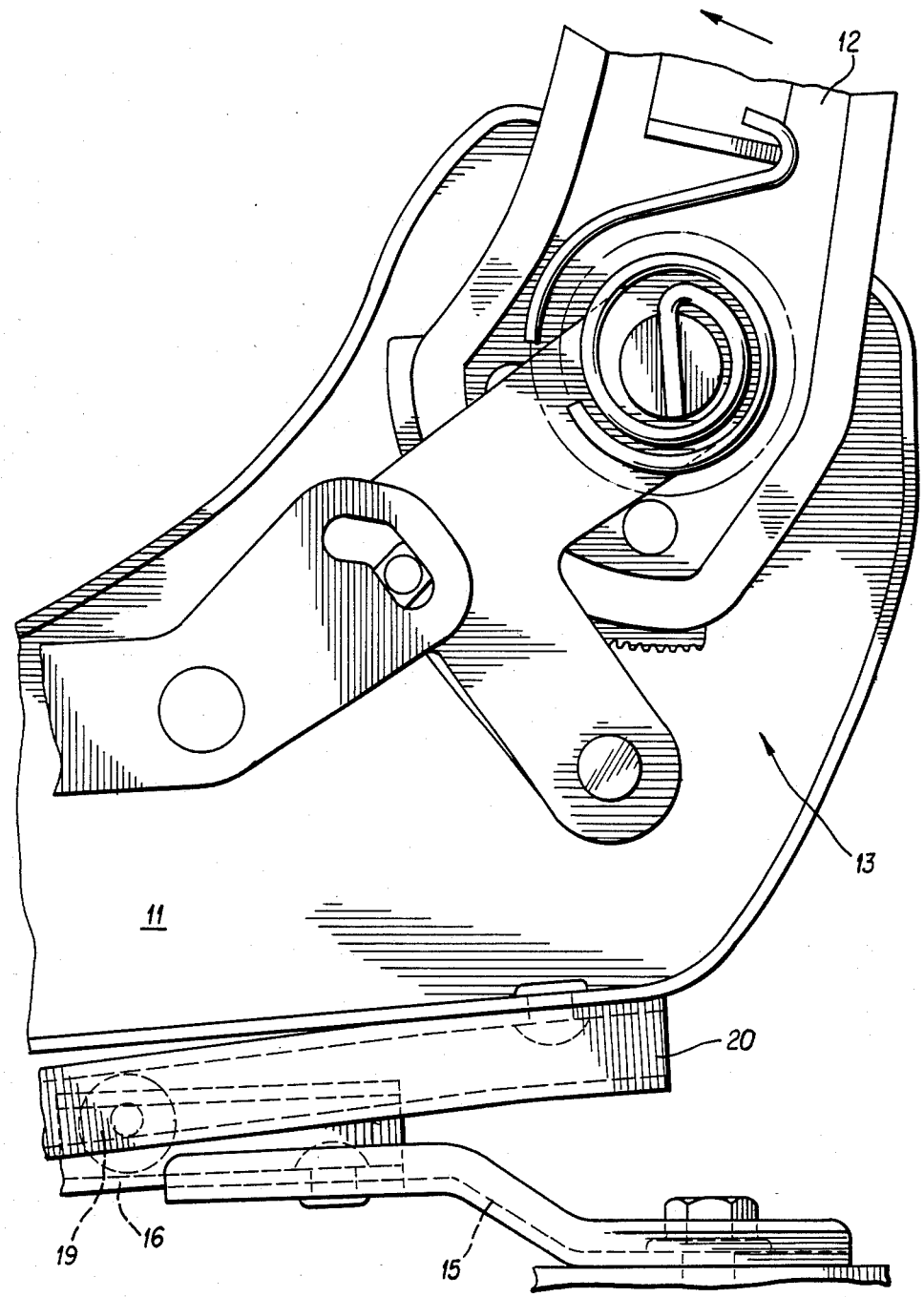
FIG. 3 is a side view of a seat recliner mechanism in FIG. 1.
Figure 5:
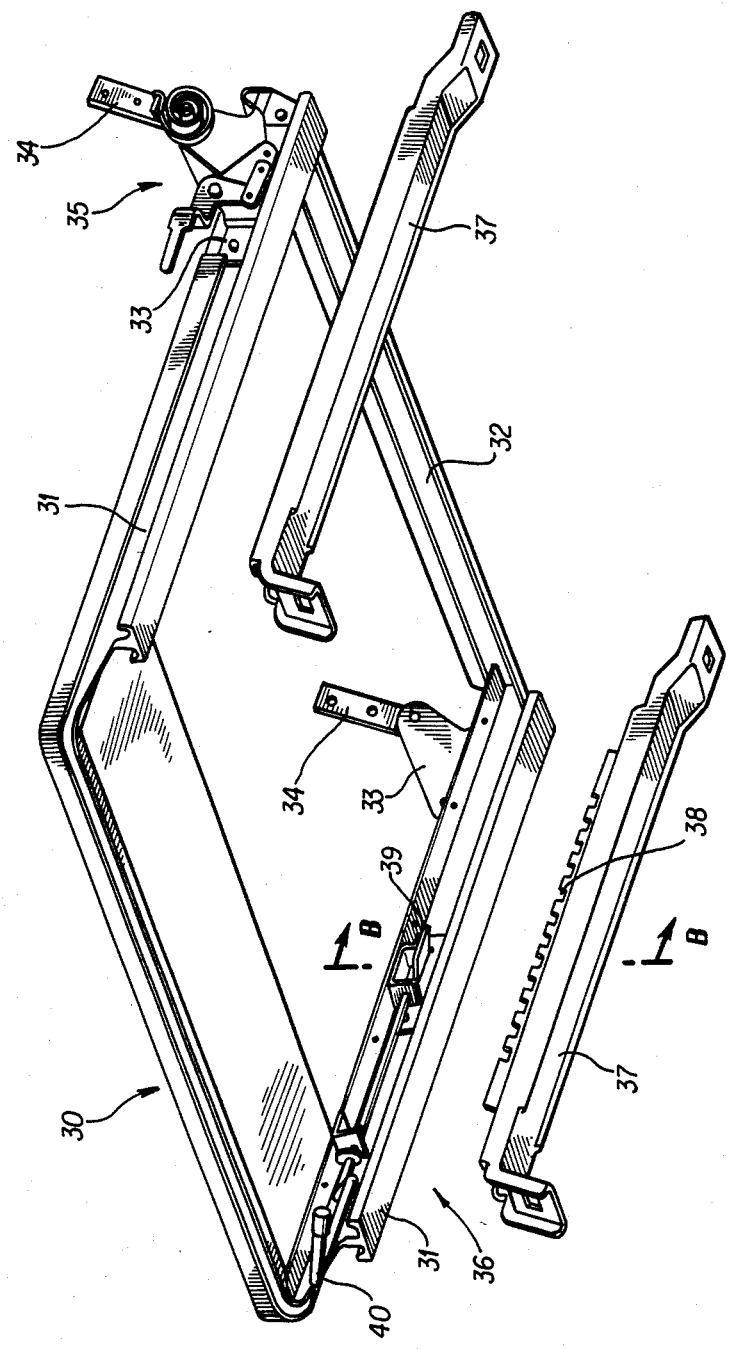
FIG. 5 is an exploded perspective view of a seat for a vehicle according to the present invention.

Referring now to FIG. 5, the numeral 30 indicates a ]-shaped seat frame which includes opposite sides thereof facing each other. Upper rails 31 are formed in a body on the lower end of both sides of the seat frame 30, respectively. Both ends of a connecting frame 32 are fixedly secured to the open ends of both sides of the seat frame 30. Fixed on both sides of the seat frame 30 are recliner arms 33 with which recliner upper arms 34 are functionally connected. Functionally interposed between one recliner lower arm 33 and one recliner upper arm 34 is a seat recliner mechanism 35 which adjusts the positions of a back rest of a seat (not shown).

A seat sliding mechanism 36 is also shown which comprises lower rail brackets 37 fixed on a floor (not shown) of a vehicle, a plurality of latch teeth 38 formed on one of the brackets 37, upper rails 31 movable in the front and rear direction against the lower rail brackets 37, a pawl 39 positioned in the inner side of the seat frame 30 and engageable with one of the teeth 38, and an operational handle 40 functionally connected with the pawl 39 and releasing the engagement between one of the latch teeth 38 and the pawl 39.

Figure 6:
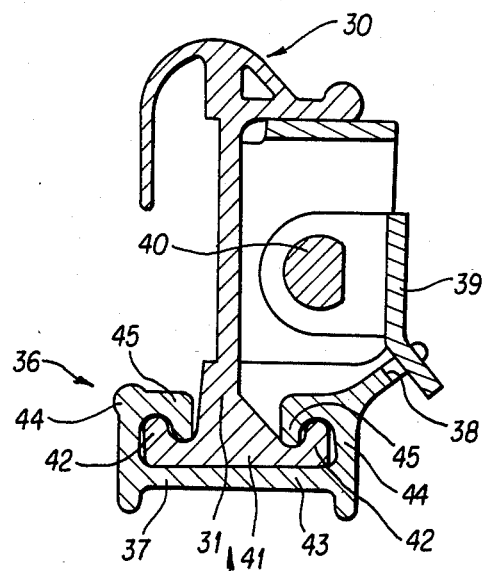
FIG. 6 is a sectional view taken along line B—B in FIG. 5.

As shown in FIG. 6, the upper rail 31 formed in a body portion on the seat frame 30 includes a base portion 41 extending horizontally to both sides, and protrusions 42 projecting vertically in the upper direction from both ends. On the other hand, the lower rail bracket 37 includes a base portion 43 extending along the lower surface of the base portion 41 of the upper rail 31, extensions 44 protruding vertically in the upper direction from both ends of the base portion 43 and extending along the outer side surface of the protrusions 42 of the upper rail 31, and bent portions 45 bending and extending in the inner direction from the extensions 44 and bending in the lower direction along the inner side surface of the protrusions 42. Accordingly, the upper rail 31 is engaged with the lower rail bracket 37 so that the base portion 41 and the protrusions 42 may be positioned or enclosed in the base portion 43, the extensions 44 and the bent portions 45.

Figure 8:
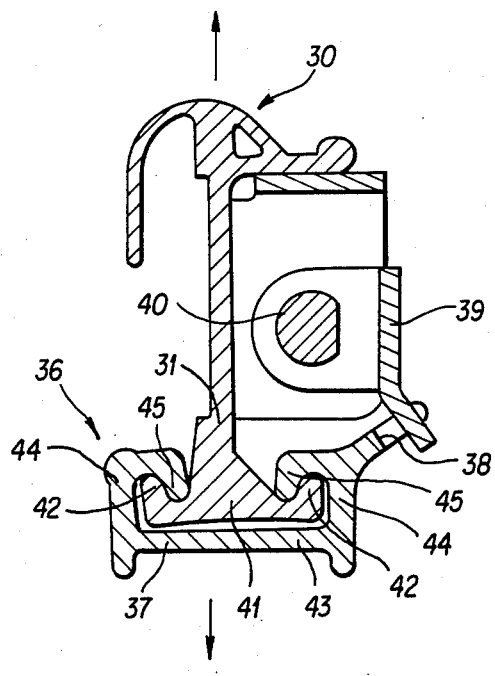
FIG. 8 is a sectional view of the seat recliner mechanism when a load acts in the upper and lower direction in FIG. 6.
Figure 7:
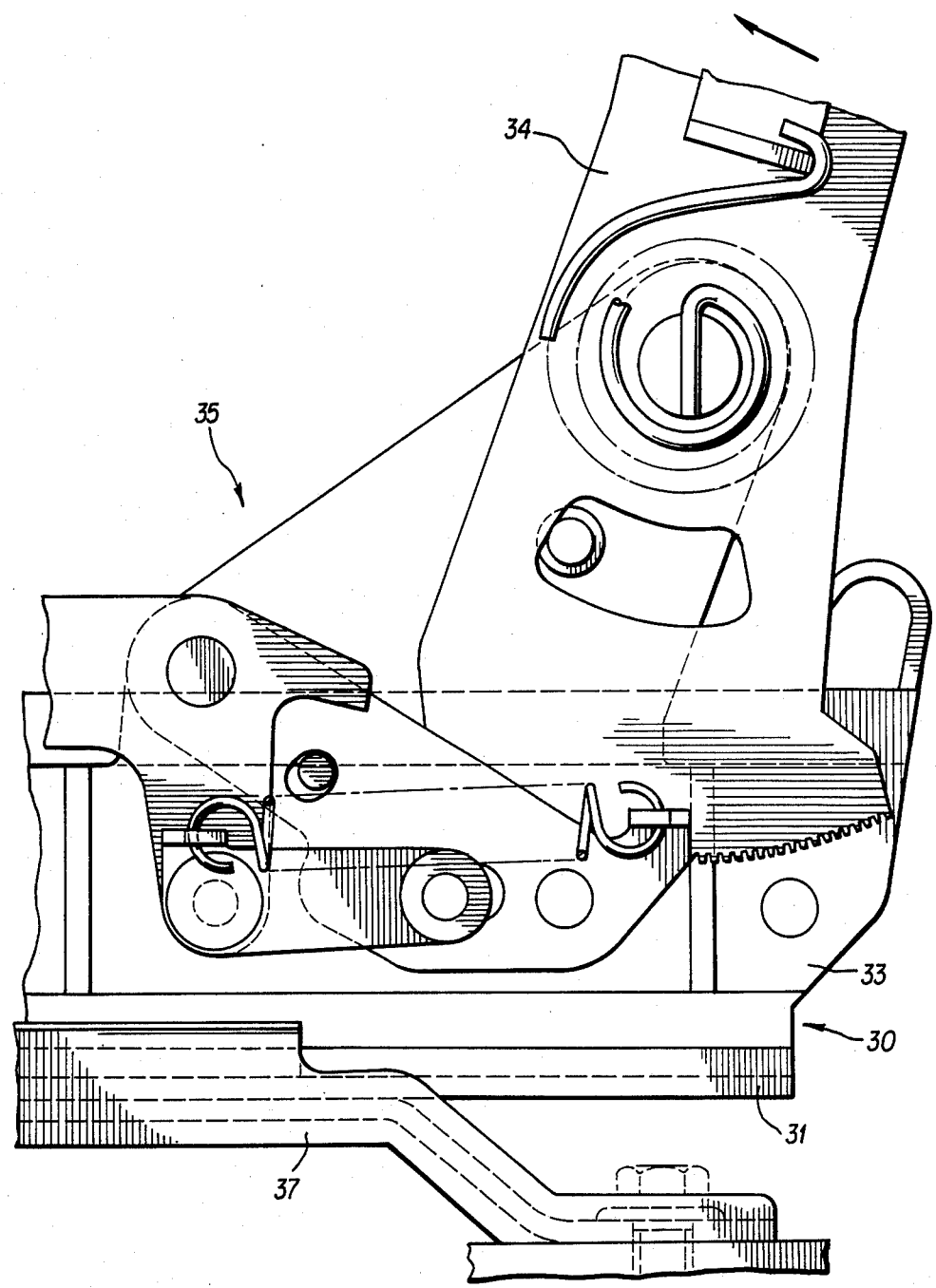
FIG. 7 is a side view of a seat recliner mechanism in FIG. 5.

As shown in FIG. 7 and FIG. 8, when a load is placed on the seat back of the seat upon collision of the vehicle with another vehicle as shown by an arrow in FIG. 7, the load will be placed on the upper rail 31 in the upper direction as shown by an upper directional arrow in FIG. 8 and on the lower rail bracket 37 in the lower direction as shown by an lower directional arrow in FIG. 8. As previously discussed, however, the upper rail 31 is engaged with the lower rail bracket 37 by means of positioning or enclosing the upper rail 31 in the lower rail bracket 37. Since the upper rail 31 and the lower rail bracket 37 are thus tightly engaged with each other, these two members 31, 37 cannot be easily broken and destroyed.

Figure 11:
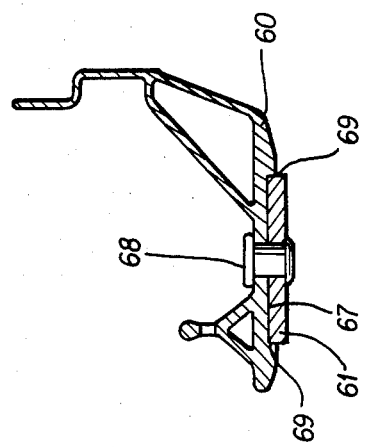
FIG. 11 is a sectional view taken along line D—D in FIG. 9.
Figure 10:
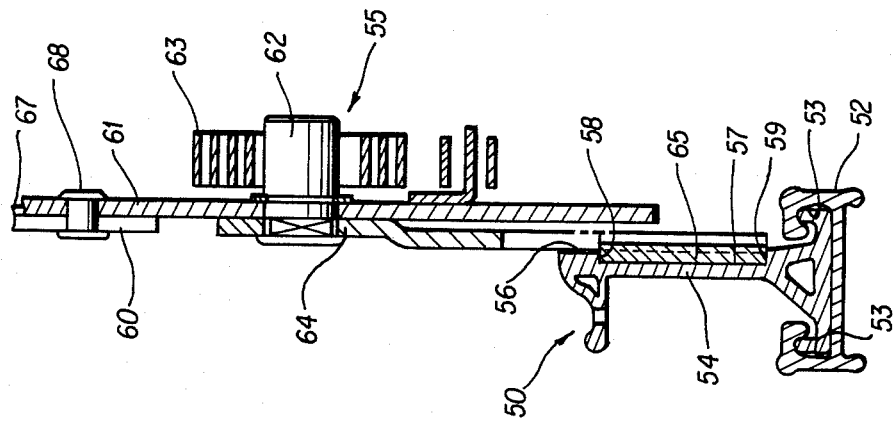
FIG. 10 is a sectional view taken along line C—C in FIG. 9.

FIGS. 9, 10 and 11 show a modification of the seat frame according to this invention. On the surface of the outer wall of a side portion 54 of a seat frame 50 there is provided a rectangular shaped channel 57 which elongates in the length direction. The rectangular shaped channel 57 is open to the outside and includes shoulders 58, 59. On the other hand, a bracket 64 is connected by means of a pin 62 and spring 63 to a segment 61, having a rack, fixed on a frame 60 of a back rest. On both ends of the bracket 64 there is provided projections 65 protruding in the direction of the seat frame 50. The projection contacts with the surface of the inner wall of the rectangular shaped channel 57 of the seat frame 50 and with the shoulders 58, 59 formed at the upper and lower ends of the rectangular shaped channel 57. That is to say, the rectangular shaped channel 57 of the seat frame 50 is engaged with the projection 65 of the bracket 64 by means of a pin 66 or a bolt, whereby the seat frame 50 and the bracket 64 are fixed to each other. The segment 61 and the back rest frame 60 are fixed to each other by engaging a back rest frame channel 67 formed on the frame 60 with a top portion of the segment 61 and by utilizing a pin 68 as shown.

In the above-mentioned construction, when a large load is put on the back rest frame 60 due to the collision of the vehicle, in the direction shown by an arrow A in FIG. 9, the load will be transmitted to the seat frame 50 through the segment 61 and the bracket 64. At this time, one projection 65 transmits the loads to the seat frame 50 in the direction or arrows B, and the other projection 65 transmits the load to the seat frame 50 in the direction of arrows C. Since the projections 65 have sufficient width, the load is transmitted in the directions of arrows B and C by means of surface contact. Therefore, the load is dispersed and transmitted to the seat frame 50, thereby preventing the centered load from acting only on the pin 66. As the result, the seat frame 50 and the bracket 64 will need no reinforcement members, and thus there will be no need to form both members 50, 64 of a steel material having the same thickness. It will be possible to make the thickness of the members 50, 64 relatively thin and to form both members 50, 64 of a alloy of aluminum or a synthetic resin material, and thus to lighten the weight of the seat. Furthermore, since the top portion of the segment 61 is engaged with the back rest frame channel 67 of the back rest frame 60, the load shown by the arrow A in FIG. 9 is transmitted to the segment 61 through the surface contact between both members 60, 61, thereby preventing the centered load from acting the pin 68.

Figure 12:
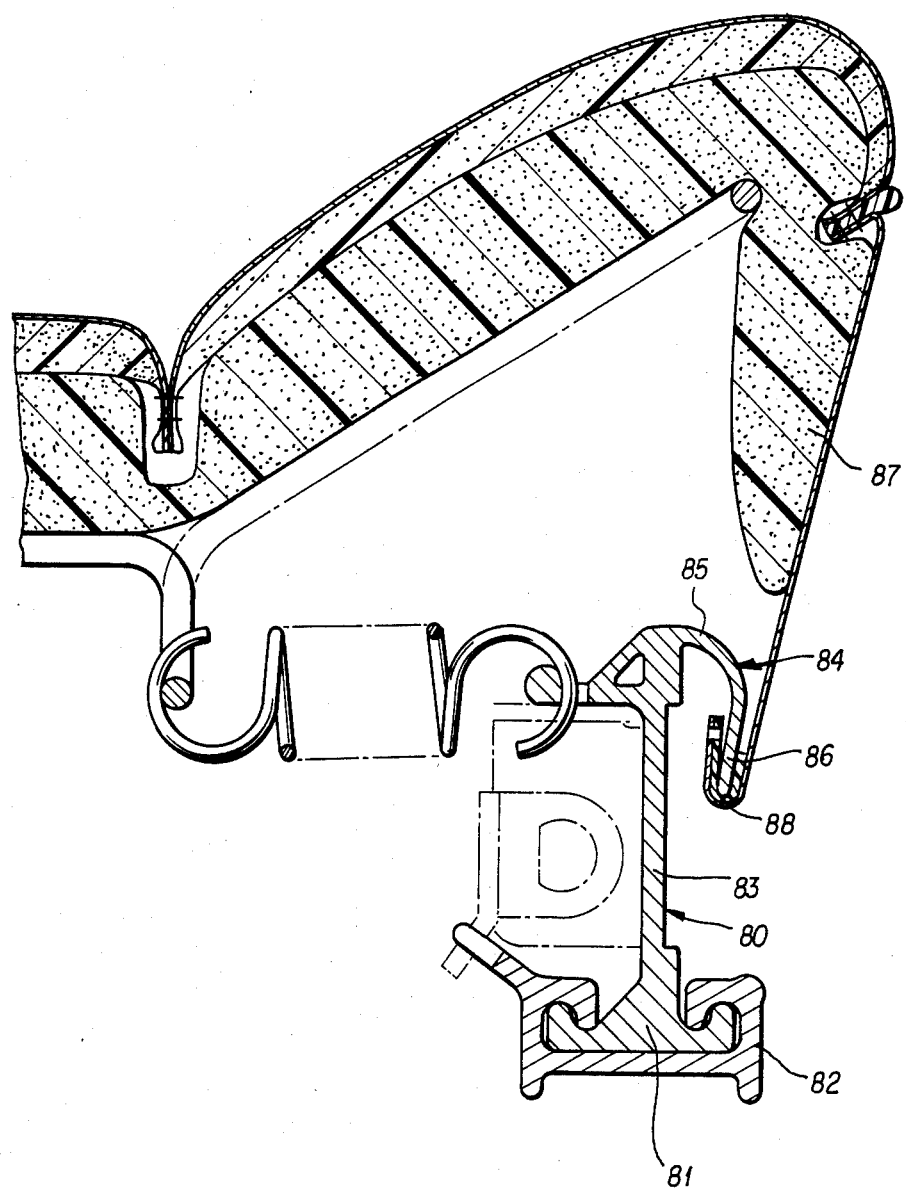
FIG. 12 is a sectional view showing an assembly of a seat frame and a lower rail, according to the present invention.

FIG. 12 shows another modification of the seat frame. A seat frame 80 includes a base portion 81 engaging a lower rail 82, a main body 83 extending from the base portion 81, and a retainer portion 84 extending from the main body 83 in outer and lower directions. The retainer portion 84 which is formed as a single body with the main body 83 includes a smooth wall 85 and an engaging portion 86 positioned at the end of the retainer portion 84. Since the retainer portion 84 for a seat cushion 87 is thus formed in as a single body on the seat frame 80, the seat cushion 87 can be easily installed by only engaging a hook 88 of the seat cushion 87 with the engaging portion 86 of the retainer portion 84.

These and other modifications and alternations will be apparent to those skilled in the art. Accordingly, the foregoing detailed description of a preferred embodiment of the invention is to be considered exemplary in nature and not as limiting to the scope and sprit of the invention as set forth in the appended claims.

What is claimed as new and is intended to be secured by Letters Patent is:

1. A seat assembly having a back rest mounted on a back rest frame and being mounted on a floor through sliding means, comprising:
   first and second parallel lower rail brackets fixed on said floor, each lower rail bracket comprising a lower rail of unitary construction extending in a longitudinal direction of said seat assembly, said lower rail comprising a base portion having a substantially flat upper surface, first and second extensions extending upwardly from opposite sides of said base portion, and first and second bent portions extending toward each other from upper portions of said extensions and ending in respective downwardly directed portions;

a seat frame comprising a body of unitary construction having first and second longitudinally-extending side portions joined at ends thereof by a transversely-extending portion, each side portion of said seat frame having a lower end formed as a longitudinally-extending upper rail slidably received in said lower rail, said upper rail having a substantially flat lower surface in sliding contact with said substantially flat upper surface of said lower rail and first and second upwardly-extending protrusions, said first and second bent portions of said lower rail restrainingly engaging said upper rail from above and comprising means for cooperating with said protrusions for resisting collision-generated forces tending to separate such upper and lower rails and for minimizing damage to said upper and lower rails, there being a longitudinally-extending channel formed in each side portion of said seat frame above said upper rail, each said channel being formed by upper and lower straight and parallel shoulders extending longitudinally of and outwardly from a substantially planar side face of said side portion of said seat frame;

a back rest frame;

first and second brackets respectively disposed on opposite sides of said seat frame, being fixed on said seat frame and supporting said back rest frame, each said bracket comprising at least first, second and third bracket portions, said first bracket portion being disposed adjacent said channel, but transversely spaced therefrom, and extending upwardly to a location above the level of the top of the seat frame, said second bracket portion comprising a rear projection extending rearwardly from the rear of said first bracket portion and into said channel, said rear projection having a substantially flat face in surface contact with said substantially planar side face of said side portion of said seat frame and further having upper and lower surfaces, said upper surface of said rear projection being in surface contact with said upper shoulder of said channel, said third bracket portion comprising a forward projection extending forward from the front of said first bracket portion and into said channel, said forward projection having a substantially flat face in surface contact with said substantially planar side face of said side portion of said seat frame and further having upper and lower surfaces, said lower surface of said forward projection being in surface contact with said lower shoulder of said channel;

fastening means fixing both rear projections on said seat frame; and fastening means fixing both forward projections on said seat frame, wherein said forward and rear projections and said upper and lower shoulders comprise means for dispersing collision-generated forces from said brackets over an extended portion of said seat frame and relieving said fastening means of at least a portion of said collision-generated forces.

2. A seat assembly as claimed in claim 1, further comprising:

a plurality of latch teeth formed on said lower rail means;

a pawl movably mounted on said seat frame for engaging with at least one of said latch teeth; and a handle operably connected with said pawl for releasing the engagement between said latch teeth and said pawl.

3. A seat assembly as claimed in claim 1, further comprising:

a segment fixed on said back rest frame; and adjustment means pivotally connecting said bracket to said segment fixed on said back rest frame, said adjustment means comprising means for adjusting the position of said back rest with respect to said seat frame.

4. A seat assembly according to claim 1 or claim 3, wherein said seat assembly includes a seat cushion and further comprising retainer means for said seat cushion formed in a body portion of said seat frame.

5. A seat assembly as claimed in claim 1, wherein said seat frame further comprises seat cushion retainer means integrally formed therewith along said longitudinal direction thereof and having a constant cross-sectional shape therealong.

* * * * *